United States Patent [19]
Zank et al.

[11] Patent Number: 5,120,908
[45] Date of Patent: Jun. 9, 1992

[54] ELECTROMAGNETIC POSITION TRANSDUCER

[75] Inventors: Anthony E. Zank, Simi Valley; Michael N. Gilano, Irvine, both of Calif.

[73] Assignee: Gazelle Graphic Systems Inc., Irvine, Calif.

[21] Appl. No.: 607,537

[22] Filed: Nov. 1, 1990

[51] Int. Cl.⁵ .................................. G08C 21/00
[52] U.S. Cl. ............................ 178/19; 340/706
[58] Field of Search .............. 178/18, 19; 340/706

[56] References Cited

U.S. PATENT DOCUMENTS

| | | | |
|---|---|---|---|
| 3,975,592 | 8/1976 | Carvey | 178/18 |
| 4,088,842 | 5/1978 | Ikedo | 178/19 |
| 4,210,775 | 7/1980 | Rodgers et al. | 178/19 |
| 4,213,005 | 7/1980 | Cameron | 178/18 |
| 4,216,352 | 8/1980 | Chamuel | 178/19 |
| 4,273,954 | 6/1981 | Takeuchi et al. | 178/19 |
| 4,289,927 | 9/1981 | Rodgers | 178/19 |
| 4,368,351 | 1/1983 | Zimmer | 178/19 |
| 4,492,819 | 1/1985 | Rodgers et al. | 178/19 |
| 4,507,523 | 3/1985 | Gohara et al. | 178/19 |
| 4,582,955 | 4/1986 | Blesser | 178/19 |
| 4,645,869 | 2/1987 | Rockwell et al. | 178/19 |
| 4,653,086 | 3/1987 | Laube | 379/96 |
| 4,786,765 | 11/1988 | Yamanami et al. | 178/19 |
| 4,810,838 | 3/1989 | Ichinokawa et al. | 178/19 |
| 4,818,826 | 4/1989 | Kimura | 178/19 |
| 4,831,216 | 5/1989 | Landmeier | 178/19 |
| 4,841,290 | 6/1989 | Nakamo et al. | 340/707 |
| 4,848,496 | 7/1989 | Murakami et al. | 178/19 |
| 4,855,538 | 8/1989 | Jacob-Grinschgl et al. | 178/18 |
| 4,868,351 | 9/1989 | Watanabe et al. | 178/19 |
| 4,890,096 | 12/1989 | Taguchi et al. | 340/712 |
| 4,910,363 | 3/1990 | Kobayashi et al. | 178/18 |
| 4,918,263 | 4/1990 | Jacob-Grinschgl et al. | 178/19 |

OTHER PUBLICATIONS

"Introduction to Graphic Digitizers" by W. Creitz and G. Helser; GTCO Corporation, Columbia, Md.; Title page, pp. 3-43; 1986.

*Primary Examiner*—Stafford D. Schreyer
*Attorney, Agent, or Firm*—Sheldon & Mak

[57] ABSTRACT

Disclosed is electromagnetic transducer that does not require complex analog to digital, digital to analog converters, microprocessors or large memory circuitry. The transducer has a helical transmitter coil with tap nodes spaced between its end extremities. An oscillator drives the coil for simultaneously producing oppositely directed current on opposite sides of selected taps, creating a moving fringing field that is compatible with modern graphic display tablet technology. A control circuit of the transducer has a closed-loop integrator for detecting the centroid of a received stylus signal. Analog and digital versions of the integrator are disclosed.

38 Claims, 3 Drawing Sheets

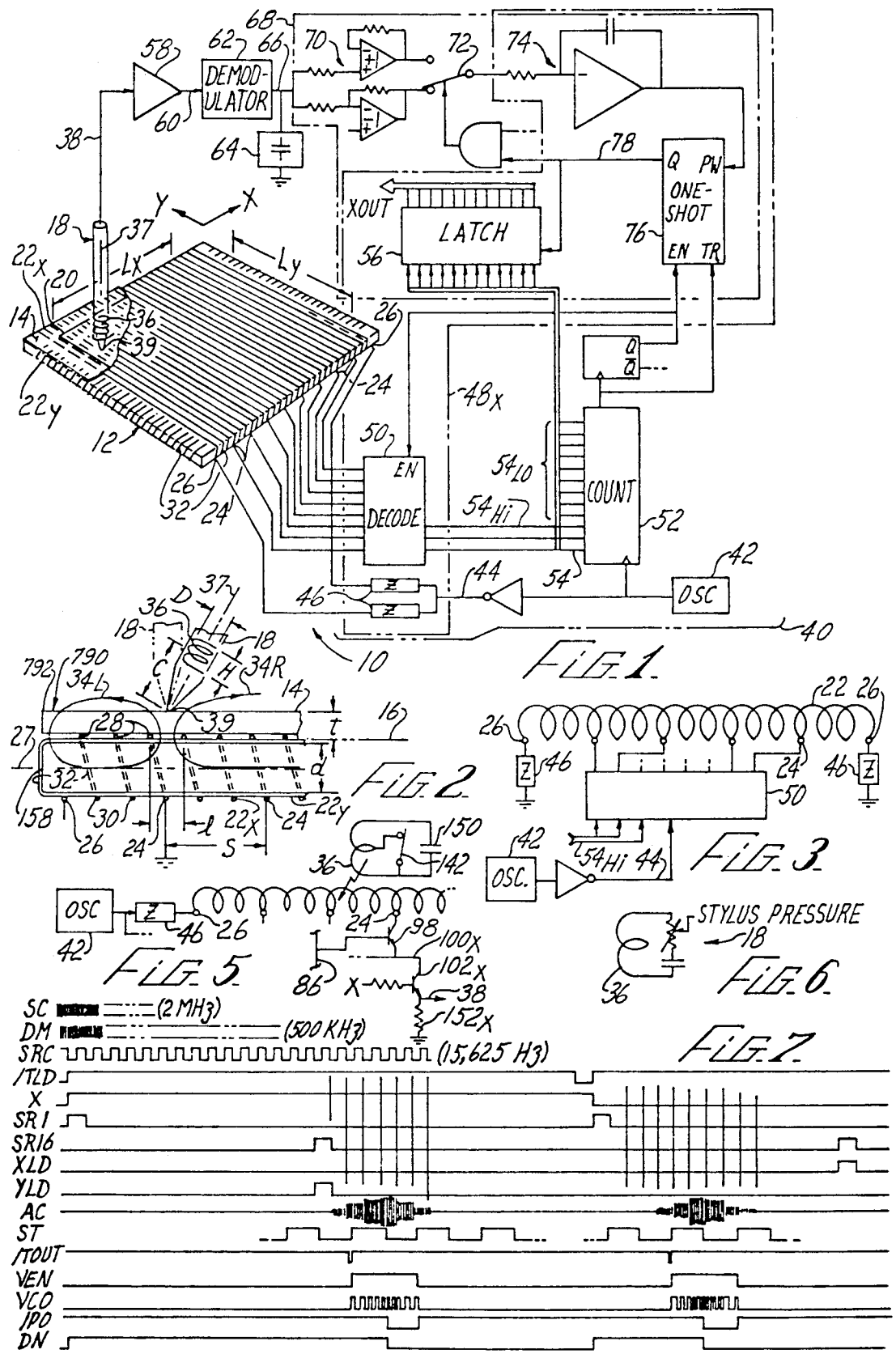

ELECTROMAGNETIC POSITION TRANSDUCER

BACKGROUND

The present invention relates to position transducers such as graphic tablets and the like for inputting absolute coordinate data to complex control systems and other electronic equipment.

Position input devices such as joysticks, trackballs, and "mice" are commonly used for feeding incremental data to a computer in response to an operator's hand movements, the operator usually adjusting the movements while observing a screen display of the computer. In some important applications, it is desired to feed coordinates that are directly measured from an existing exhibit such as a drawing. In these applications the incremental input devices have major shortcomings regarding both scale factor and position reference.

Accordingly, a variety of graphic tablets have been developed for generating computer position data from a workpiece such as a drawing. Typical graphic tablets of the prior art provide absolute position data relative to a fixed or adjustable reference, the data being generated in response to a stylus that is moved by the operator over the drawing surface. Among the important performance parameters of such transducers are accuracy, repeatability, resolution in both distance and time, range, limiting speed, and ease of operation. Also important are cost, reliability, and compatibility with related systems such as graphic displays.

An important class of graphic tablet incorporates an orthogonal pair of conductor patterns within the tablet. The stylus carries a coil from which a stylus signal is generated. See for example, U.S. Pat. No. 3,975,592 to Carvey, which discloses an array of the conductors in each pattern, the conductors being sequentially energized for producing corresponding electric fields, one of the fields being detected by the stylus for determining a coarse position of the stylus, after which a subset of the conductors is energized at a different rate. In successive cycles of the sequential energization, a sampled counterpart of the stylus signal is integrated positively, then negatively at double amplification. A counter is latched when the integration output reaches zero, the latched counter value being intended to represent the centroid of the detected signal relative to the coarse position. However, latched counter values fail to indicate the real-time centroid of the stylus signal in that computations based on successive samples are employed, the results being subject to error when there is movement of the stylus between samples. Also, cumbersome and expensive sample-and-hold circuitry is required.

Another problem with such systems is that the detected field strength between the coarse positions is non-linear. U.S. Pat. No. 4,088,842 to Ikedo discloses nonlinear interpolation for detecting intermediate positions of the stylus in a system having the stylus excited and an array of planar pick-up coils in the tablet. Nonlinear interpolators, however, are undesirably complex, expensive to produce, and limited in accuracy. In fact, most electromagnetic coordinate tablets of the prior art require sophisticated signal processing by complex and expensive analog to digital and digital to analog converters, microprocessors, and computer memory. Further, most such tablets use strictly 2-dimensional conductor patterns that are expensive to produce, even with printed circuit techniques. Also, in order to avoid expensive interpolation errors, very fine coarse resolution is resorted to, with consequent added circuit complexity and cost.

Another class of coordinate reading devices utilizes magnetorestrictive material as a vibration transmission media. See, for example, U.S. Pat. Nos. 4,216,352 to Chamuel and 4,273,954 to Takeuchi et al. These and similar systems are subject to the limitations of accurately measuring or converting from full scale analog values.

If is often desirable to combine a graphic display capability in a coordinate position transducer. Unfortunately, however, some display devices can be adversely affected by strong electromagnetic fields such as are produced by typical coordinate transducers. Also, magnetorestrictive materials such as used in some coordinate tablets are opaque, thus preventing the use of backlighting, etc.

Thus there is a need for a position transducer that provides high accuracy, repeatability, range and resolution, that is easy to operate, reliable and inexpensive to produce, yet is compatible with low-cost graphic computer and display devices.

SUMMARY

The present invention is directed to an electromagnetic transducer that meets this need without requiring complex analog to digital, digital to analog converters, microprocessors or large memory circuitry. The transducer includes a helical electrically conductive transmitter coil having a plurality of coil turns and first and second end extremities, and a plurality of coil tap nodes spaced between the end extremities; oscillator means for producing a coil drive current; selector means for sequentially connecting the oscillator means between the end extremities and selected ones of the coil tap nodes for producing a moving fringing field resulting from portions of the coil drive current flowing in opposite directions in the coil on opposite sides of each of the selected nodes; a transducer body movable in a first transducer direction relative to the transmitter coil and having a receiver coil fixedly mounted thereto; and circuit means connected to the selector means and responsive to the receiver coil for providing a first position signal representing the position of the transducer body relative to a first position reference that is perpendicular to the first direction. The current flow between the selected tap node and the opposite end extremities thereof can be simultaneous. Preferably, the transmitter coil includes oppositely helically wound coil components for returning the coil drive current from the selected nodes to an end extremity of the transmitter coil, for suppressing stray magnetic fields. Alternatively, the current flows one direction during a first predetermined interval, then in the opposite direction during a second predetermined interval. In another alternative, the coil includes multiple, overlapping oppositely wound helixes, the current flowing simultaneously in opposite directions through coils wound in opposite directions, thus enhancing field strength, and reducing or eliminating stray current paths around the periphery of the tablet, resulting in improved performance near the end extremities.

The transducer coil can be cylindrically helical about a coil axis that is parallel to the first transducer direction, including front and back portions on opposite sides of the coil axis, the coil taps being located on the back portion of the coil, the transducer further including means for guiding the body at a predetermined probe distance from the front portion of the coil. Preferably the front and back portions of the transducer coil are spaced part by a winding distance d, the distance d being at least approximately 0.03 inches for avoiding undesirable magnetic flux concentration at the coil end extremities. Preferably the turns of the transmitter coil are substantially uniformly spaced for defining a constant scale factor of the transducer.

The receiver coil can be cylindrically symmetrical about a receiver axis, the transducer body defining a stylus point on the receiver axis, the stylus point moving at the probe distance from the front portion of the coil. Preferably, the coil turns are spaced in the direction of the coil axis by a uniform turn spacing. Preferably a central point within the receiver coil on the receiver axis is offset by a coil distance from the stylus point, the coil distance being approximately 0.4 inch for permitting uniform operation of the transducer within a range of inclinations of the receiver axis relative to orthogonal alignment with the front portion of the coil. Preferably the transducer also includes means for gating the circuit means, whereby the circuit means is responsive to the receiver coil during a limited sample interval during which a subset of the coil tap nodes are activated by the selector means for enhancing the uniformity of operation over the range of inclinations of the receiver axis. More preferably, the duration of the sample interval is approximately equal to the time during which four of the coil tap nodes are selected by the selector means. The receiver coil can include a pair of bi-filar wound receiver coil components, the circuit means including a balanced differential input amplifier, the receiver coil components driving the amplifier for producing a receiver signal, the amplifier rejecting stray electrical noise.

The front coil portion can be substantially planar, the means for guiding the body including a planar tablet surface for slidably supporting the body. The transmitter coil can be a first coil, the transducer including a second transmitter coil that is orthogonally supported relative to the first transmitter coil. An electronic graphic display unit can be included for forming the tablet surface. The display unit can be visually responsive to movement of the transducer body relative to the tablet surface. The front portions of the transmitter coils can be substantially coplanar.

The oscillator means can include an oscillator circuit having an oscillator output and a reference voltage, the oscillator output driving the coil end extremities, the reference voltage being sequentially connected to at least some of the coil tap nodes by the selector means. The oscillator circuit can include a square wave oscillator. Preferably the end extremities of the transmitter coil are connected to the oscillator circuit through a constant current drive circuit, a low-pass frequency filter being connected between the oscillator circuit and the constant current drive circuit for shaping a smooth AC transmitter coil current waveform. Dual-axis position measurements can be performed in alternating axis intervals, the end is:extremities of the first and second transmitter coils being driven by common constant current sources through diode isolators.

Preferably the transmitter coil has a plurality of the turns between each of the coil tap nodes for concentrating the fringing field. The circuit means can include a receiver node, a receiver signal at the receiver node being responsive to the magnitude of the fringing field at the receiver coil. The receiver node can be electrically connected to the receiver coil. Alternatively, the receiver node can be electrically connected to the transmitter coil for wireless operation of the receiver coil, the receiver signal being responsive to electric current loading of the transmitter coil by the receiver coil. Threshold means can be included for detecting a predetermined magnitude of the receiver signal, the threshold means providing a valid signal when the transducer body is aligned within a predetermined distance from the transmitter coil. The oscillator circuit can be operable in a burst mode having a burst duty cycle that is less than approximately 20 percent for conserving electrical power. The burst mode can be terminated for at least a predetermined period of time upon occurrence of the valid signal.

Preferably the circuit means further includes integrator means for summing a first-polarity component of the receiver signal during a first cycle interval and for summing an opposite-polarity component of the receiver signal during a second cycle interval for locating a centroid of the receiver signal, the circuit means also having latch means for latching a variable position signal that is representative of the location of the sequentially connected coil tap nodes along the transmitter coil, and feedback means for activating the latch means at the receiver signal centroid in response to the integrator means, the first cycle interval terminating and the second cycle interval commencing upon activation of the latch means. The variable position signal can be generated by an N-state counter, N being a multiple M of the number of the coil tap nodes of the transmitter coil, the selector means decoding the N-state counter for connecting each of the coil tap nodes to the oscillator means during an interval group number of counter states, the interval group number corresponding to the multiple M. The N-state counter can be clocked by the oscillator means. The multiple M can be nominally between 1 and 1024. The first and second cycle intervals can be limited to a total sample interval that corresponds to a number P of the counter states, the number P being the multiple M multiplied by a sample factor, the sample factor being from approximately 2 to approximately 5. Preferably the sample factor is approximately 4 for enhancing the uniformity and linearity of the transducer.

The integrator means can include a bidirectional counter and a variable frequency oscillator, the frequency of the variable frequency oscillator being responsive to the magnitude of the receiver signal.

In another aspect of the present invention, a method is disclosed for measuring a coordinate position, including the steps of:

(a) providing a helical transmitter coil having end extremities and a plurality of coil tap nodes spaced between the end extremities;

(b) driving the transmitter coil with an AC signal for producing electrical current in the coil simultaneously in opposite directions on both sides of a selected one of the coil tap nodes;

(c) sequentially selecting a plurality of the coil tap nodes for producing a moving fringing field;

(d) locating a receiver coil at the coordinate position for producing a receiver signal responsive to the fringing field; and (e) detecting a centroid position of the receiver signal, the centroid position being representative of the coordinate position.

DRAWINGS

These and other features, aspects, and advantages of the present invention will become better understood with reference to the following description, appended claims, and accompanying drawings, where:

FIG. 1 is a combination perspective and simplified schematic diagram of position transducer apparatus according to the present invention;

FIG. 2 is a sectional view showing a magnetic field configuration of the apparatus of FIG. 1;

FIG. 3 is a schematic diagram showing an alternative configuration of a portion of the apparatus of FIG. 1;

FIG. 5 is a schematic diagram showing an alternative configuration of a circuit portion of the apparatus of FIG. 4;

FIG. 6 is a schematic diagram of an alternative configuration of a portion of the circuit of FIG. 5;

FIG. 7 is a timing diagram for the apparatus of FIG. 4;

DESCRIPTION

Figure 4:
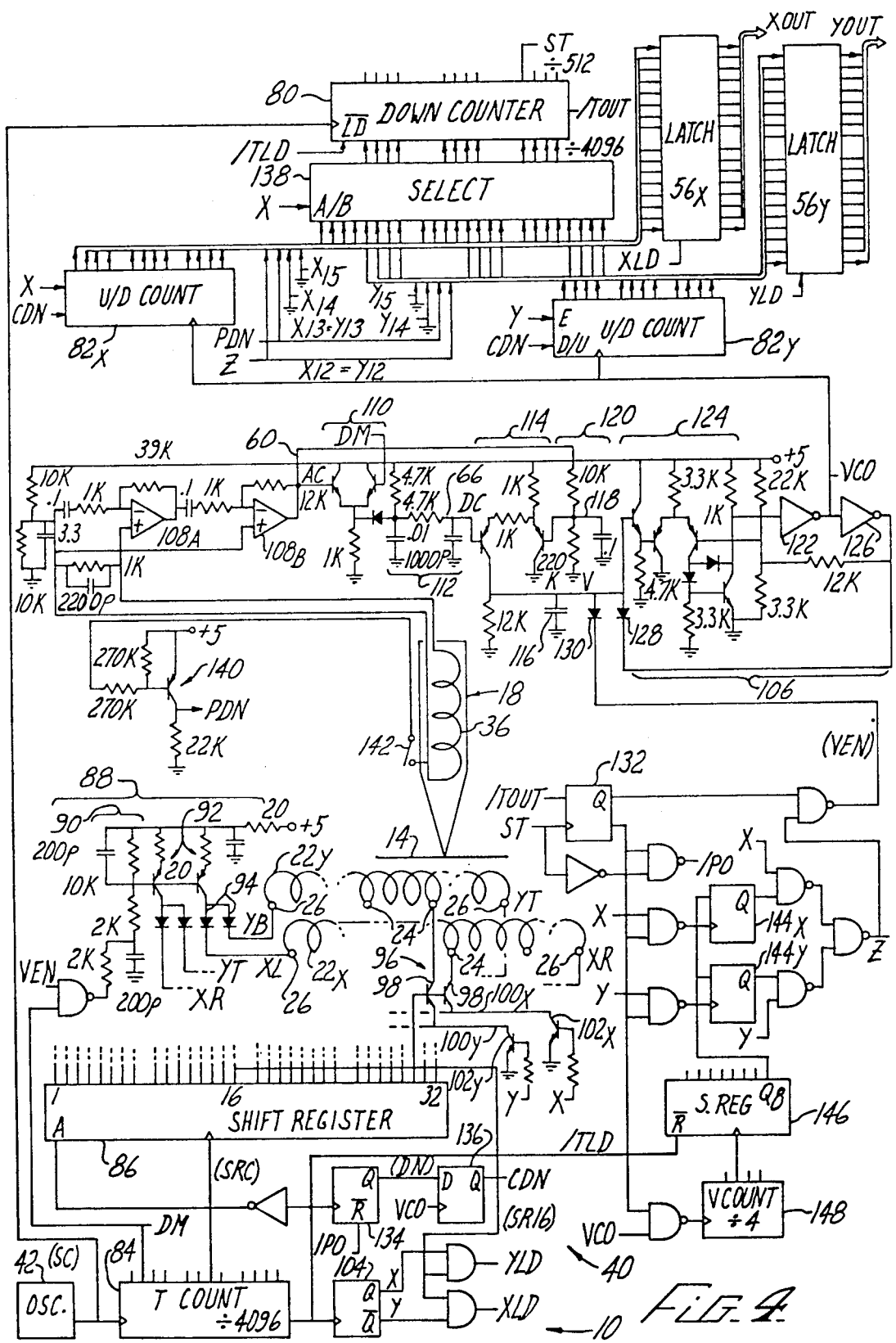
FIG. 4 is a schematic diagram showing an alternative configuration of the apparatus of FIG. 1.

The present invention is directed to an electromagnetic transducer, an exemplary configuration of which forms a graphic tablet that provides digital coordinate data for a computer or similar system in response to operator control. With reference to FIGS. 1 and 2 of the drawings, a transducer apparatus 10 according to the present invention includes a 3-dimensional coil assembly 12, a tablet surface 14 being supported in fixed parallel relation to a major coil plane 16 of the coil assembly 12 for movably supporting a stylus assembly 18 at a predetermined tablet distance t from the major coil plane 16. The tablet surface 14, as further described below, can receive a drawing 20 or the like, the stylus assembly 18 being manually movable upon features of the drawing 20 for measurement thereof.

The coil assembly 12 includes a pair of helical coils 22, designated $22_X$ and $22_Y$, each of the coils 22 having a plurality of taps 24 and a pair of end extremities 26. As used herein, the term "helical" is used in its broad sense, meaning generated by a point that moves with a distance component parallel to a line, the distance component increasing in one direction only as the point orbits the line, the point advancing a minimum distance in the parallel direction for each orbit of the line. In a preferred configuration of the coils 22 as depicted in the drawings, the coils 22 are also cylindrical in that the turns of each coil lie on a surface that is generated by a line that moves parallel to a stationary line or coil axis 27. The turns of each coil 22 each have a top portion 28 substantially in the coil plane 16 and a bottom portion 30 uniformly spaced below the coil plane 16, the coil axis 27 being located midway between the top and bottom portions 28 and 30, the portions 28 and 30 being spaced apart by a coil depth d. The top portions 28 are parallel and uniformly spaced apart by a turn spacing l, each of the bottom portions 30 being located midway between neighboring top portions 28 and parallel thereto. Each coil 22 also includes a plurality of obliquely oriented side portions 32 that serially connect the top and bottom portions 28 and 30. The top portions 28 and the bottom portions 30 of the respective coils $22_X$ and $22_Y$ are orthogonal for permitting independent measurement of corresponding X and Y position coordinates of the stylus assembly 18, X and Y coordinate directions being indicated by the arrows in FIG. 1.

The taps 24 are preferably provided at the edges of at least some of the coil bottom portions 30. In the configuration of FIGS. 1 and 2, every third bottom portion 30 of each coil 22 has one of the taps 24, the taps 24 having a tap spacing $S = 3l$. As best shown in FIG. 2, adjacent turns of the coils 22 on opposite sides of the taps 24 produce an electromagnetic fringing field 34, having right and left flux paths 34R and 34L, when energized as described herein, the field 34 being concentrated between adjacent ones of the top portions 28 on opposite sides of a selected one of the taps 24. A stylus coil 36 is provided within the stylus assembly 18, the coil 36 being concentric with a stylus axis 37 of the assembly 18. The stylus coil 36 is responsive to the fringing field 34 for producing a stylus signal 38, also further described herein, when a stylus point 39 that is formed on the axis 37 at a lower extremity of the stylus assembly 18 is in proximate contact with the tablet surface 14.

With particular reference to FIG. 1, the coil assembly 12 and the stylus assembly 18 are connected to a feedback control circuit 40 of the apparatus 10. The control circuit 40 includes an oscillator 42 for AC drive of each of the coils 22, a buffered output 44 from the oscillator 42 being connected to each of the end extremities 26 of the coils 22 through a suitable passive coil terminator 46, a pair of the terminators 46 being included in an X axis portion $48_X$ of the control circuit 40 for driving the coil $22_X$. The control circuit 40 also includes a Y axis counterpart $48_Y$ (not shown) of the circuit portion $48_X$. The taps 24 of each coil 22 are sequentially driven by a demultiplexer or decoder 50 that is included within the axis portion $48_X$ for driving a selected one of the taps 24 to a reference or ground potential, outputs of the decoder 50 having appropriate power handling capacity for passing a desired level of current through the coil assembly 12. The fringing field 34 is thus produced by electrical current that flows to the selected tap 24 in opposite directions from the end extremities 26 of the associated coil 22. The purpose of the terminators 46 is to reduce high frequency electromagnetic radiation from the coils 22 by filtering harmonics from the current of the buffered output 44 from the oscillator 42. Also, the output 44 can be a conveniently obtained square wave voltage, with a substantially sine-wave current profile being produced in the coil 22. The terminators 46 also serve to balance the current in the coil 22, equalizing the current between the selected tap 24 and the opposite end extremities 26.

With further reference to FIG. 3, an alternative configuration of the control circuit 40 has the oscillator 42 being selectively connected to the taps 24 through the decoder 50, the coil terminators 46 being connected to a reference such as ground as depicted in FIG. 3. The fringing field 34 in this alternative configuration has the same form as described above in connection with FIG. 2 because the current distribution in the coil 22 is the same except for flowing in opposite directions from the case of the circuit configuration of FIG. 1. Advantageously, the configuration of FIG. 1 permits the decoder 50 to be arranged more simply than for the alternative configuration, being required only to sink current at ground potential from the selected tap 24.

The oscillator 42 also provides timing for the control circuit 40, the oscillator output 42 clocking a binary counter 52 having a plurality of counter outputs 54 in two groups. The most significant counter outputs, designated $54_{Hi}$, drive corresponding inputs of the decoder 50 for sequentially selecting the taps 24, whereby the fringing field 34 is caused to move stepwise along each of the coils 22. The counter outputs $54_{Hi}$, together with the other counter outputs, designated $54_{Lo}$, are also fed to a latch circuit 56 for storing X coordinate data that is produced by the apparatus 10 as described herein.

As indicated above, the stylus signal 38 is responsive to the fringing field 34 according to the position of the stylus assembly 18 relative to the coil assembly 12. The stylus signal 38 is fed to a stylus amplifier 58, from which an AC sensor output 60 is connected to a demodulator 62 and low-pass filter 64 for producing a DC sensor output 66 for driving a closed-loop centroid null circuit 68 according to the present invention. The null circuit 68 includes a phase splitter 70, a polarity selector 72, an integrator amplifier 74, a one-shot or timer 76 having a latch output 78, and the latch circuit 56, the coordinate data present at the latch circuit 56 being stored therein upon activation of the latch output 78. The integrator amplifier 64 and the timer 76 are also included with the latch circuit 56 in the axis portion $48_X$ of the control circuit 40. The polarity selector 72 feeds the integrator amplifier 74 alternately with in-phase and inverted counterparts of the DC sensor output 66, also in response to the latch output 78 of the timer 76, the timing duration of the timer 76 being variable in response to the output of the integrator amplifier 74. Operation of the polarity selector 72 by the timer 76 is such that the signal to the integrator amplifier 74 is balanced about a null reference level, the latch output 78 being activated in successive integration cycles of the null circuit 68 for latching the coordinate data and reversing the direction of integration at the centroid of the DC stylus signal 66.

Once latched, and until the next integration cycle, the latch 56 holds a binary representation of the position of the stylus assembly 18 relative to the end extremity 26 adjacent to the first-selected tap 40 of the coil 22. In continuing operation of the control circuit 40, the axis portions $48_X$ and $48_Y$ alternately store the X and Y coordinate positions of the stylus assembly 18.

An important advantage of the coil assembly 12 of the present invention is that the centroid location of the stylus signal 38 is a highly linear function of the coordinate position of the stylus point 39 on the stylus surface 14 relative to the position of the selected tap 24. As the stylus point 39 approaches the selected tap 24, the amplitude of the stylus signal 38 increases linearly until the point 39 passes above the tap 24, then the signal 38 symmetrically decreases as the point continues away from the tap 24. Thus there is no need for complex non-linear interpolation hardware or software in the present invention. Whereas the uncompensated linearity between coarse positions of typical prior art tablet transducers having planar conductor patterns is only about 50%, the coil assembly 12 of the present invention provides a linearity of approximately 1% or better between adjacent taps 24.

The coil assembly 12 can advantageously incorporate a graphic display unit 790 that forms the tablet surface 14, the display unit 790 having a flat display panel 792 that provides, for example, a visual display of the path of the stylus point 39 on the tablet surface 14. The fringing field 34 penetrates the display panel 792 without interfering with electronics therein, and the apparatus 10 can include or operate in conjunction with a metalized or electro-luminescent backlight assembly (not shown). Advantageously, special shielding is not required between the display panel 792 and other components of the apparatus 10, because the field 34 is of the fringing type. Most of the field 34 is contained within the coil assembly 12, and the lack of special shielding allows the control circuit 40 and other electronics to be located immediately behind or in the same plane as the coil assembly 12 along one edge thereof.

Several methods exist for minimizing stray electromagnetic fields around the tablet periphery or underside. These include shielding of current return wires, placing return wires on the back side of the tablet, returning the current through "return" helixes overlayed on the primary helix, and dividing the return current equally between driven return helixes. This helix return method totally eliminates stray current flow. Other current return options include multiplexing current flow in the tablet to be non-simultaneous, controlled by fixed timing or by variable timing tied to the position of the stylus pick-up. These methods, used singly or in combination, are effective for enlarging the useful area of the transducer 10, and for avoiding undesirable interference with other nearby electronic equipment. One particularly advantageous alternative configuration of the coil 22 is described below in connection with FIG. 9.

With further reference to FIG. 4, an alternative configuration of the control circuit 40 has the null circuit 68 of FIG. 1 implemented digitally. In an exemplary and preferred digital configuration, the timer 76 is replaced by a down-counter 80 that is clocked directly by the oscillator 42 and periodically loaded with position data; the integrator amplifier 74 is replaced by respective up/down counters 82, designated $82_X$ and $82_Y$ in FIG. 4, the counters 82 generating the position data for the down-counter 80; and the polarity selector 72 is replaced by direction controls CDN for the up/down counters 82. A clock divider 84 replaces the binary counter 52, the divider 84 being operated at 2.0 MHz by a system clock signal SC from the oscillator 42, the divider 84 having a demodulator output DM at 500 KHz for operating a synchronous demodulator (described below) and for driving the coils 22 as described below. The divider 84 also generates a shift register clock SRC at a submultiple of the DM output frequency, and a carry or timer load output /TLD at a submultiple frequency of the clock SC. Also, the decoder 50 is replaced by a coil drive shift register 86, the shift register 86 being clocked at 15,625 Hz by the clock SC of the clock divider 84. A single bit of the shift register 86 is periodically activated at approximately 2 ms intervals by the output /TLD of the clock divider 84, the other bits of the shift register 86 being sequentially activated in successive cycles of the clock SC. In the exemplary configuration of FIG. 4, there are 32 outputs of the shift register 86 for sequentially activating up to 32 of the taps 24 of each of the coils 22.

A coil buffer circuit 88 receives the DM output (square wave) from the clock divider 84, the buffer circuit 88 including a low-pass filter 90 and a pair of current waveform drivers 92 for producing an approximately sine-wave current into the opposite end extremities 26 of the tablet coils 22. A pair of steering diodes 94 is provided at each of the current drivers 92 for isolating the end extremities 26 of the tablet coils $22_X$ and $22_Y$.

A tap driver circuit 96 is connected between the taps 24 of the tablet coils 22 and the outputs of the shift register 86 for sinking to ground the coil current from the selected tap 24. The tap driver circuit 96 includes a plurality of tap driver transistors 98, each driver transistor 98 being connected between one of the taps 24 and an appropriate ground select line 100, there being a pair of the select lines $100_X$ and $100_Y$ associated with the respective tablet coils $22_X$ and $22_Y$. The shift register 86 has at least as many stages as the number of taps 24 on the longest of the coils 22. Each of the ground lines 100 is selectively connected to ground by a grounding transistor 102 in response to corresponding axis enable signals X and Y (described herein), the grounding transistors being designated $102_X$ and $102_Y$. In configurations of the apparatus 10 wherein the number of stages of the shift register 86 matches the number of taps 24 on each of the coils $22_X$ and $22_Y$, there would be a pair of the driver transistors 98 activated from each output of the shift register 86, one of the transistors 98 sinking current from a tap 24 of one tablet coil 22 and the grounded select line 100. The tablet coils $22_X$ and $22_Y$ are driven in alternate cycles of the clock divider 84, the output /TLD driving an axis divider 104 for producing complementary cycle outputs X and Y, the cycle outputs X and Y activating, respectively, the grounding transistors $102_X$ and $102_Y$.

The up/down counters $82_X$ and $82_Y$ are driven at variable frequency by a variable frequency oscillator (VCO) 106 in response to the sensor outputs 60 and 66 as described herein. As indicated in FIG. 4, the stylus amplifier 58 is implemented as an AC coupled pair of high-speed operational amplifiers 108, designated $108_A$ and $108_B$, the stylus coil 36 being connected between a passively generated reference voltage VR and a non-inverting input of the first amplifier $108_A$, the voltage VR also being used as a reference for the second amplifier $108_B$, the AC sensor output 60 being produced by the second amplifier $108_B$. A synchronous demodulator 110 is used in place of the demodulator 62 of FIG. 1 for rejecting out of phase components of the AC sensor output 60. The demodulator 110 feeds a counterpart of the low-pass filter 64, designated 112 in FIG. 4, the filter 112 being relatively fast for rapid response of the DC sensor output 66 to the AC sensor output 60. The DC sensor output 66 is fed to a comparator circuit 114 for charging a capacitor 116 at a rate proportional to the extent the DC sensor output 66 (active low) goes a predetermined amount below a reference voltage 118, the reference voltage 118 being produced by a passive low frequency filter 120 that is driven by the AC sensor output 60. Thus the reference voltage 118 represents an average DC value of the AC sensor output 60, the filter 120 having a much slower response than the low-pass filter 112. The comparator circuit 114 is very sensitive to changes in the DC sensor output 66, but compensates for DC offset drift such as might be introduced by the amplifier $108_B$ because the low frequency filter 120 is resistively coupled to the AC sensor output 60. An exemplary and preferred configuration of the low frequency filter 120 has a response time on the order of 1 ms, while the low-pass filter 112 has a response time of 0.025 ms, successive ones of the taps 24 being activated at intervals of approximately 2 ms.

The VCO 106 is operative over a frequency range of from DC to above 1 MHz, having an output inverter 122 that is driven by a fast (Baker-clamped) comparator 124, the comparator 124 being responsive to a voltage V at the capacitor 116 and having positive feedback from a feedback inverter 126 that is fed by the VCO output from the inverter 122. The output of the feedback inverter 126 is also connected to the capacitor 116 through a diode 128, the diode 128 providing a discharge path for the capacitor 116, the voltage V at the capacitor 116 increasing when a current in excess of a threshold current is produced by the comparator circuit 114, and decreasing when the VCO output of the inverter 122 is high. Also, the VCO 106 is gated by a VEN signal (described below) that is connected to the capacitor 116 by a diode 130, the VCO output of the inverter 122 being held at ground when the VEN signal is low, the diode 128 then preventing the voltage V at the capacitor 116 from rising. Thus the VCO 106 clocks the counters 82 at rates proportional to the magnitude of the DC sensor output 66, whenever the output 66 is sufficiently large and the VEN signal is also high.

The VEN signal is arbitrarily held high until a lock signal Z (further described below) is activated for permitting the counters 82 to stabilize upon initial entry of the stylus assembly 18 within the fields 34 of the coil assembly 12. When the lock signal Z is active, the VEN signal is responsive to an enable flip-flop 132 that is momentarily set during a terminal count sequence of the down counter 80 by a /TOUT signal from a "carry" output of the counter 80, the flip-flop 132 being clocked by an ST output from an intermediate stage of the counter 80. In the exemplary circuit configuration of FIG. 4, the ST output is from the ninth stage of the (12 stage) counter 80, thus activating the VEN signal for 256 μs following activation of the /TOUT signal, 256 μs corresponding to the period for four tap selections by the shift register 86. A /PO signal is activated during the second half cycle of the ST output that activates the enable flip-flop 132, the /PO signal resetting a first direction flip-flop 134, a DN signal from the flip-flop 134 being fed to a second direction flip-flop 136 for producing the direction signal CDN synchronously with the VCO output. Thus the counters 82 count downwardly during the first half of VEN (when the lock signal Z is active), then upwardly during the second half of VEN. Thus once lock is achieved, the VCO 106 operates only during an interval of time that is equivalent to the duration of four selections of taps 24 by the shift register 86 and the associated tap driver circuit 96. Accordingly, in each axis cycle (X or Y) beginning with activation of the /TLD output of the counter 84, the counter 82 retains its prior value until the /TOUT signal is activated by underflow of the down-counter 80, the down-counter 80 having previously been set with the contents of the counter 82 by the /TLD signal for delaying the VEN signal until approximately two tap selections prior to a time associated with a previously determined position of the stylus assembly 18. Selection between the data from the counters $82_X$ and $82_Y$ to be loaded into the down-counter 80 is effected by an axis selector 138 in response to the X signal from the axis divider 104, whereby the down-counter 80 is loaded with X and Y position data in alternate axis cycles. Upon activation of the VEN signal, and in the presence of a sufficiently large output from the stylus 18 as described above, the counter 82 commences counting down at a rate proportional to the DC sensor output 66 until the CDN signal goes low (on the first VCO pulse after the midpoint of the VEN signal) at which point the counter 82 counts upwardly until termination of the VEN signal, at which point the counter 82 holds a new coordinate position measurement for that axis.

Counterparts of the latch circuit 56, designated 56$x$ and 56$y$ in FIG. 4, are loaded with the X and Y coordinate data from the counters 82$x$ and 82$y$ subsequent to termination of the respective count sequences. Conveniently, this can be effected for each axis during activation of the other axis. Arbitrarily, the midpoint of the inactive intervals is used for loading the latch circuits 56, respective XLD and YLD strobe signals for the latch circuits 56 being enabled by an SR16 output of the shift register 86, gated with the opposite Y and X signals from the axis divider 104. In the circuit of FIG. 4, each of the latch circuits 56 is implemented with 16 data bits, including 12 bits of position data, the lock signal Z, and a pen down signal PDN, two unused bits being available for future use. The signal PDN is generated by a switch circuit 140 that is connected to a push-button switch 142 on the stylus assembly 18, the switch 142 providing a mouse "click" or similar function whereby an operator of the apparatus 10 can signal the location of the stylus point 39 at particular features of the drawing 20, for example.

Operation of the control circuit 40 of FIG. 4 is illustrated in the exemplary timing diagram of FIG. 7, wherein the AC sensor output 60 is labeled "AC". As shown in FIG. 7, AC is active during six tap selections of the coil 22$x$ (X active) immediately following activation of SR16, and during six tap selections of the coil 22$y$ (X inactive). In this example, the stylus point 39 would be slightly to the right of midway between the 20th and 21st taps 24 in the X direction of the coil 22$x$. Accordingly, the AC signal bursts are shown as being asymmetrical about the tap selection transitions of the shift register clock SRC, the burst during X being concentrated to the right of the transition to the 20th taps 24 of the coil 22$x$, the other burst being concentrated to the left of the transition to the 8th tap 24 of the coil 22$y$ slightly below midway between the 7th and 8th taps 24 in the Y direction of the coil 22$y$.

In the above example, and assuming that the lock signal Z is active, the initiation of the /PO signal (and the midpoint of the VEN signal) follows the centroid of that portion of the stylus signal 138 that lies within the period of activation of the VEN signal. Thus the stylus signal 38 is advantageously ignored when the selected tap 24 is more than two positions from the stylus point 39, thereby facilitating uniform response of the apparatus 10 to positions of the stylus point 39 approaching the end extremities 26 of the coils 22. As also shown in FIG. 4, the coil buffer circuit 88 is gated with the VEN signal for significant power savings while the lock condition is maintained. For example, in the 32-bit configuration of the drive shift register 36, the power consumption by the coil 22 is reduced to approximately one-eighth when lock is achieved. Even using the 8 tap configuration of the coil 22 shown in FIG. 1 with an 8-bit configuration of the shift register 86, an approximately 50 percent power savings is possible.

More importantly, the gating of the stylus signal 38 as described above advantageously enhances the tolerance of the apparatus 10 to variations of the stylus axis 37 from being normal to the tablet surface 14. As shown in FIG. 2, the stylus coil 36 has a diameter D (which is preferably greater than the turn spacing l) and a coil height H, the midpoint of which is located a coil distance C from the stylus point 39. An experimental prototype of the apparatus 10 has been built and tested, the relevant dimensions of the stylus assembly 18 being approximately D=0.25 inch, H=0.2 inch (200 turns of wire), and C=0.40 inch. Similarly, the coil assembly 12 of the experimental prototype was fabricated with the relevant dimensions being approximately l=0.10 inch, S=0.30 inch, d=0.10 inch, and t=0.20 inch. Although the stylus signal 38 is somewhat insensitive to variations in the orientation of the stylus axis 37 from being perpendicular to the tablet surface 14, when the VCO 106 is gated as described above, there is a marked improvement in the immunity of the control circuit 40 to such variations.

Based on further testing of and modifications to the experimental prototype, it is believed that when the VCO 106 is enabled for a period corresponding to four cycles of the shift register clock SRC, a high degree of immunity to tipping of the stylus assembly 18 is achieved approximately when $D \geq S \cong C$.

As discussed above, the VEN signal to the VCO 106 is forced high continuously until occurrence of the lock signal Z. As further shown in FIG. 4, a pair of lock flip-flops, designated 144$x$ and 144$y$, are set during corresponding axis intervals when at least a predetermined number of pulses are produced by the VCO prior to underflow of the down-counter 80. This condition is produced when the DC sensor signal 66 is significantly large for sufficiently charging the capacitor 116 above the current threshold discussed above in connection with the comparator 114 when a coil tap 24 is selected that is approximately two tap positions from the stylus point 39. The occurrence of the predetermined number of pulses is detected by a 8-bit lock shift register 146 that is clocked by every fourth VCO pulse prior to occurrence of the/TOUT signal by a VCO divider 148; thus the predetermined number of VCO pulses is 32 for occurrence of the lock signal Z.

With further reference to FIGS. 5 and 6, a wireless configuration of the stylus assembly 18 has the stylus coil 36 shorted through a shunt reactance, which can be a shunt capacitor 150 as shown in FIG. 5, or a direct shorting connection. In this configuration, current induced in the stylus coil 36 loads the transmitter coil 22. The stylus signal 38 is generated by a current sensing resistor 152 that is connected between each grounding transistor 102 and ground, variations in the current from the selected taps 24 resulting from the proximity of the stylus coil 36 to the selected tap 24. As further shown in FIG. 5, a counterpart of the push button switch 142 is connected across a portion of the stylus coil 36 for permitting an appropriate counterpart of the switch circuit 140 (not shown) to generate the PDN signal in response to operation of the push button switch 142 by phase discrimination. Alternatively a variable resistance counterpart of the push button switch 142, designated pressure sensor 154, can be connected in series with the shunt capacitor 150 as shown in FIG. 6, the pressure sensor 154 being responsive to the pressure between the stylus point 39 and the tablet surface 14. The mechanical connection between the pressure sensor 154 and the stylus point 39 can be by any means known to those skilled in the art.

Figure 8:
FIG. 8 is a schematic diagram of an alternative configuration of a portion of the circuit of FIG. 1.

Alternatively, and with further reference to FIG. 8, improved rejection of stray noise and electrical fields is achieved using a dual counterpart of the stylus coil 36, coil portions 36a and 36b being wound bi-filar and connected through a shielded cable 155 to the stylus amplifier 58, the amplifier 58 being configured as a balanced differential input amplifier for producing the AC sensor output 60 as shown in FIG. 8.

Figure 9:
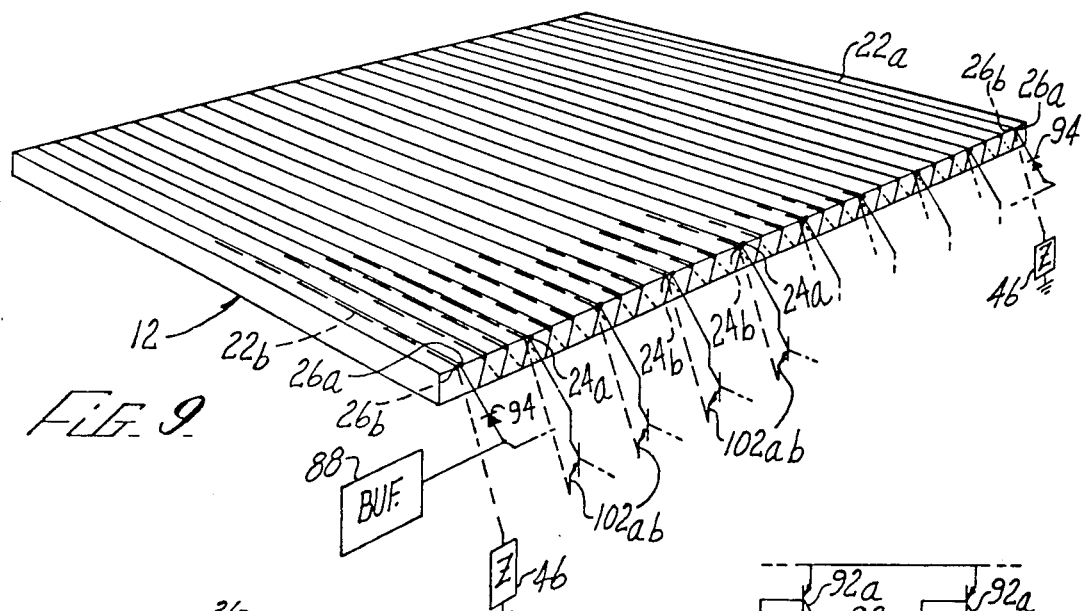
FIG. 9 is a combination perspective and simplified schematic diagram of a portion of the apparatus of FIG. 1.

With further reference to FIG. 9, an alternative configuration of the coil assembly 12 has the transmitter coils 22 formed with oppositely wound winding components 22a and 22b, only one transducer axis being depicted for clarity. The winding component 22a is similar in form to the winding $22_X$ of FIG. 1 and having end terminations 26a and tap nodes 24a, the component 22b (shown by dashed lines) being wound in an opposite direction and having end terminations 26b and tap nodes 24b. Tap selection in the coil configuration of FIG. 9 may be effected in a variety of ways, FIG. 9 further illustrating one preferred selection circuit. In particular, the end terminations 26a are driven from the coil buffer circuit of FIG. 4, the end terminations 26b are grounded through counterparts of the coil terminators 46 of FIG. 1, and selected tap nodes 24a and 24b are shorted together by counterparts of the grounding transistors 102, designated selector transistors 102ab.

In the coil configuration of FIG. 9, current flows simultaneously from the buffer circuit 88 through the end extremities 26a in opposite directions toward the selected tap node 24a, then in opposite directions away from the selected tap node 24b, through the end extremities 26b, thence through the coil terminators 46 to ground. The coil configuration of FIG. 9 advantageously generates a desired magnitude of the fringing field 34 using only approximately half of the coil current required for the coil configuration of FIG. 1. Also, wiring connections to the end extremities 26 and the tap nodes 24 carry current in opposite directions along parallel paths for cancellation of stray fields that would otherwise be produced by the wiring. Moreover, the oppositely wound coil components 22a and 22b themselves produce the fringing field 34 more uniformly across the tablet surface 14 of the coil assembly 12.

Figure 10:
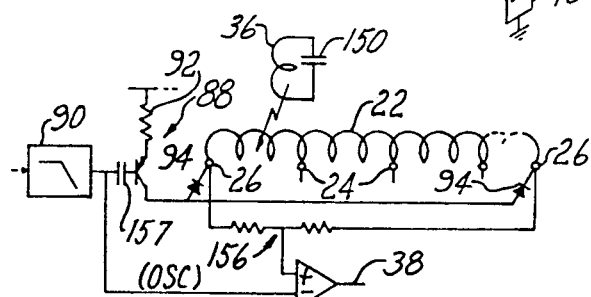
FIG. 10 is a simplified schematic diagram showing an alternative configuration of a circuit portion of the apparatus of FIG. 4.

With further reference to FIG. 10, in configurations of the control circuit 40 wherein the coil 22 is driven by a constant current, as in the configurations of FIGS. 4 and 9, wireless operation of the stylus assembly 18 can be effected by sensing variations in the voltage across the coil 22, instead of sensing variations in the current as in the configuration of FIG. 5. As shown in FIG. 10, a voltage divider 156 is connected between the end extremities 26 (26a in FIG. 9) of the coil 12 for sensing an average coil voltage, the stylus amplifier 58 comparing the average coil voltage with a counterpart of the oscillator output, designated OSC, for sensing variations in loading of the transmitter coil 22 by the stylus coil 36. As shown in FIG. 10, a decoupler 157 is provided between the filter 90 and the current waveform driver 92 of the coil buffer circuit 88 for producing the OSC signal.

Figure 11:
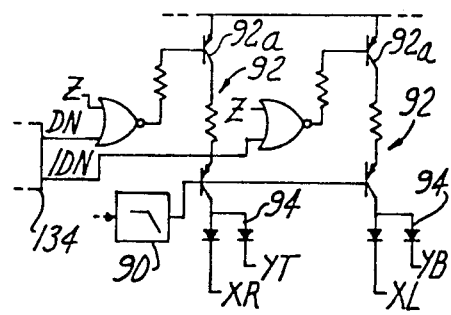
FIG. 11 is a schematic diagram shown an alternative configuration of a portion of the circuit of FIG. 4.

With further reference to FIG. 11, instead of the transistor coil current being simultaneously driven in opposite directions toward or away from the selected tap 24, the current can be driven one direction during a first predetermined interval, then in the opposite direction during a second predetermined interval. For this purpose, the current waveform drivers 92 of the coil buffer circuit 88 are gated with corresponding interval transistors 92a, one of the transistors 92a being driven in response to the DN signal, the other transistor 92a being driven in a complementary interval by a /DN signal from the first direction flip-flop 134. In FIG. 11 the DN and /DN signals are also gated with the lock signal Z for enabling alternate interval activation of the current waveform drivers 92 once the lock condition is achieved. Thus the current in each transmitter coil 22 flows from one end extremity 26 to the selected tap node 24 during the first half of the VEN interval, then the current flows from the other end extremity 26 in the opposite direction toward the selected tap node 24 during the second half of the VEN interval, because the steering diodes 94 are cross-connected to the coil extremities 26 of the transmitter coils $22_X$ and $22_Y$ as shown in FIGS. 4 and 11.

In the version of the control circuit 40 shown in FIG. 1, the decoder 50 can be implemented with generic 54/74 series integrated circuit logic such as a CMOS 74C42 decoder, the outputs of which are connected through readily available non-inverting tri-state drivers to corresponding ones of the coil taps 24. Similarly, the counter 52 can be implemented as three or more cascaded 74C161 binary counters, and the latch 56 can be implemented with any of many circuits known to those having skill in the art that are readily commercially available from a variety of sources.

In the version of the control circuit 40 shown in FIG. 4, the down-counter 80, the up-down counters 82, the counter 84, and the counter 148 can each be implemented with appropriate numbers of generic 4 bit 54/74 series '191 up/down counter integrated circuits. Similarly, the shift registers 86 and 146 can be implemented with '164 8-bit shift register circuits. The selector 138 can be implemented with a '157 quad 2-input multiplexer, and the axis divider 104 and the flip-flops 132, 134, 136, and 144 can be implemented with '74 dual D flip-flop circuits. The bipolar transistors, including bipolar transistors within the operational amplifiers 104 can be 2N2222 (NPN) and 2N2907 (PNP) types.

The tablet coils 22 can be formed on a plastic core 158, being wound with fine copper wire such as 36 AWG enameled coil wire. Proper alignment of the coil portions can be facilitated by locating grooves appropriately on the core 158. Alternatively, the tablet coils 22 can be formed using methods known to those skilled in the art of multi-layer circuit boards. These include printed conductors, using 1, 2, 3, or 4 layers and etched conductors using 1, 2, 3, or 4 layers. Implementation of 2 layer dual-coil circuits can be achieved also by slight coil distortion required to interleave traces from one side of the printed circuit assembly to the other side and back again. Any electromagnetic distortion caused by interleaving coils can be easily corrected by correction and table look-up methods commonly known to those skilled in the art.

Although the present invention has been described in considerable detail with reference to certain preferred versions thereof, other versions are possible. For example, there are several ways to implement analog and digital up/down integrators using operational amplifiers, transistors, timers, processors, analog switches, and combinations of such electronics. Similarly, there are several alternative ways to drive the tablet coil, including passive, active, constant current, AC drive at the ends, DC drive at the ends and AC drive modulation at the return, etc. The taps 24 can be connected to the return path via transistors, shift registers, or other electronic means. Therefore, the spirit and scope of the appended claims should not necessarily be limited to the description of the preferred versions contained herein.

What is claimed is:

1. A position transducer comprising:
   (a) helical electrically conductive transmitter coil having a plurality of coil turns and first and second end extremities, and a plurality of coil tap nodes thereon, the coil tap nodes being spaced between the end extremities;
   (b) oscillator means for producing a coil drive current;
   (c) selector means for sequentially connecting the oscillator means between the end extremities and selected ones of the coil tap nodes for producing a moving fringing field resulting from portions of the coil drive current flowing in opposite directions in the coil on opposite sides of each of the selected nodes;
   (d) a transducer body movable in a first transducer direction relative to the transmitter coil and having a receiver coil fixedly mounted thereto; and
   (e) circuit means connected to the selector means and responsive to the receiver coil for providing a first position signal, the first position signal representing the position of the transducer body relative to a first position reference, the first position reference being perpendicular to the first direction.

2. The transducer of claim 1, wherein the coil drive current flows simultaneously in opposite directions on opposite sides of the selected nodes.

3. The transducer of claim 1, wherein the coil drive current flows in opposite directions on opposite sides of the selected nodes in alternate intervals.

4. The transducer of claim 1, wherein the transmitter coil comprises oppositely helically wound coil components for returning the coil drive current from the selected nodes to proximate an end extremity of the transmitter coil, for suppressing stray magnetic fields.

5. The transducer of claim 1, wherein the transmitter coil is cylindrically helical about a coil axis and having front and back portions on opposite sides of the coil axis, the coil axis being parallel to the first transducer direction, the coil taps being located on the back portion of the coil, the transducer further comprising means for guiding the body at a fixed probe distance t from the front portion of the transmitter coil.

6. The apparatus of claim 5, wherein the front and back portions of the transmitter coil are spaced part by a winding distance d, the distance d being at least approximately 0.03 inches.

7. The transducer of claim 5, wherein the turns of the transmitter coil are substantially uniformly spaced.

8. The transducer of claim 5, wherein the receiver coil is cylindrically symmetrical about a receiver axis, the transducer body defining a stylus point on the receiver axis, the stylus point moving at the probe distance t from the front portion of the transmitter coil.

9. The transducer of claim 8, wherein the transmitter coil turns are spaced in the direction of the coil axis by a turn spacing l, the receiver coil having a diameter D and a length H, a central point within the receiver coil on the receiver axis being offset by a coil distance C from the stylus point, the coil distance C being approximately C=a complex function of (D, l, H, d and t) for permitting uniform operation of the transducer within a range of inclinations of the receiver axis relative to orthogonal alignment with the front portion of the coil.

10. The transducer of claim 9, wherein $D \geq S \approx C$.

11. The transducer of claim 9, further comprising means for gating the circuit means,
   whereby the circuit means is responsive to the receiver coil during a sample interval only, a subset of the coil tap nodes being activated by the selector means during the sample interval for enhancing the uniformity of operation over the range of inclinations of the receiver axis.

12. The transducer of claim 11, wherein the duration of the sample interval is approximately equal to the time during which four of the coil tap nodes are selected by the selector means.

13. The transducer of claim 8, wherein the receiver coil comprises a pair of bi-filar wound receiver coil components, the circuit means including a balanced differential input amplifier, the receiver coil components driving the amplifier for producing a receiver signal, the amplifier rejecting stray electrical noise.

14. The transducer of claim 5, wherein the front coil portion is substantially planar, the means for guiding the body comprising a planar tablet surface for slidably supporting the body.

15. The transducer of claim 14, wherein the transmitter coil is a first coil, the transducer comprising a second transmitter coil, the second transmitter coil being orthogonally supported relative to the first transmitter coil.

16. The transducer of claim 14, further comprising an electronic graphic display unit, the display unit forming the tablet surface.

17. The transducer of claim 16, wherein the display unit is visually responsive to movement of the transducer body relative to the tablet surface.

18. The transducer of claim 5, wherein the transmitter coil is a first transmitter coil, the transducer comprising a second transmitter coil, the second transmitter coil being orthogonally supported relative to the first transmitter coil, the front portions of the coils being substantially coplanar.

19. The transducer of claim 1, wherein the oscillator means comprises an oscillator circuit having an oscillator output and a reference voltage, the oscillator output driving the coil end extremities, the reference voltage being sequentially connected to at least some of the coil tap nodes by the selector means.

20. The transducer of claim 19, wherein the oscillator circuit comprises a square wave oscillator.

21. The transducer of claim 20, wherein the end extremities of the transmitter coil are connected to the oscillator circuit through a constant current drive circuit, a low-pass frequency filter being connected between the oscillator circuit and the constant current drive circuit for shaping a smooth AC transmitter coil current waveform.

22. The transducer of claim 20, comprising a pair of the transmitter coils for dual-axis position measurements in alternating axis intervals, the end extremities of the coils being driven by common constant current sources through diode isolators.

23. The transducer of claim 1, wherein the transmitter coil includes a plurality of the turns between each of the coil tap nodes.

24. The transducer of claim 1, wherein the circuit means comprises a receiver node, a receiver signal at the receiver node being responsive to the magnitude of the fringing field at the receiver coil.

25. The transducer of claim 24, wherein the receiver node is electrically connected to the receiver coil.

26. The transducer of claim 24, wherein the receiver node is electrically connected to the transmitter coil, the receiver signal being responsive to electric current loading of the transmitter coil by the receiver coil.

27. The transducer of claim 24, comprising threshold means for detecting a predetermined magnitude of the receiver signal, the threshold means providing a valid signal when the transducer body is aligned within a predetermined distance from the transmitter coil.

28. The transducer of claim 27, wherein the oscillator circuit is operable in a burst mode having a burst duty cycle, the burst duty cycle being less than approximately 20 percent for conserving electrical power.

29. The transducer of claim 28, wherein the burst mode is terminated for at least a predetermined period of time upon occurrence of the valid signal.

30. The transducer of claim 24, wherein the circuit means further comprises:
  (a) integrator means for summing a first-polarity component of the receiver signal during a first cycle interval, the integrator means also summing an opposite-polarity component of the receiver signal during a second cycle interval;
  (b) latch means for latching a variable position signal, the position signal being representative of the location of the sequentially connected coil tap nodes along the transmitter coil; and
  (c) feedback means for activating the latch means in response to the integrator means, the first cycle interval terminating and the second cycle interval commencing upon activation of the latch means.

31. The transducer of claim 30, wherein the variable position signal is generated by an N-state counter, N being a multiple M of the number of the coil tap nodes of the transmitter coil, the selector means decoding the N-state counter for connecting each of the coil tap nodes to the oscillator means during an interval group number of counter states, the interval group number corresponding to the multiple M.

32. The transducer of claim 31, wherein the N-state counter is clocked by the oscillator means.

33. The transducer of claim 31, wherein the multiple M is between 1 and 1024.

34. The transducer of claim 31, wherein the first and second cycle intervals are limited to a total sample interval, the sample interval corresponding to a number P of the counter states, the number P being the multiple M multiplied by a sample factor, the sample factor being from approximately 2 to approximately 5.

35. The transducer of claim 31, wherein the sample factor is approximately 4.

36. The transducer of claim 30, wherein the integrator means comprises a bidirectional counter and a variable frequency oscillator, the frequency of the variable frequency oscillator being responsive to the magnitude of the receiver signal.

37. A position transducer comprising:
  (a) electrically conductive first and second transmitter coils, each having a plurality of substantially uniformly spaced coil turns and opposite end extremities, and a plurality of coil tap nodes spaced between the end extremities, a plurality of the turns being included between adjacent ones of the coil tap nodes, the transmitter coils being cylindrically helical about respective first and second coplanar coil axes and having front and back portions on opposite sides of the coil axes, the coil tap nodes being located on the back portions of the respective coils;
  (b) oscillator means for producing a coil drive current simultaneously in opposite directions between opposite sides of a selected one of the coil tap nodes and the coil end extremities of the corresponding coil;
  (c) selector means for sequentially connecting the oscillator means to different selected ones of the coil tap nodes for producing a moving fringing field;
  (d) a transducer body movable relative to the transmitter coils and having a receiver coil cylindrically symmetrical about a receiver axis and fixedly mounted to the transducer body, the transducer body defining a stylus point on the receiver axis;
  (e) means for guiding the body at a predetermined probe distance from the front portions of the transducer coils;
  (f) circuit means connected to the selector means and responsive to the receiver coil for providing first and second position signals, the position signals representing position coordinates of the transducer body relative to the transmitter coils, the circuit means comprising:
    (i) a receiver node, a receiver signal at the receiver node being responsive to the magnitude of the fringing field at the receiver coil;
    (ii) integrator means for summing a first-polarity component of the receiver signal during a first cycle interval, the integrator means also summing an opposite-polarity component of the receiver signal during a second cycle interval;
    (iii) latch means for latching a variable position signal associated with each of the transmitter coils, each position signal being representative of the location of the sequentially connected coil tap nodes along the respective transmitter coil; and
    (iv) feedback means for activating the latch means in response to the integrator means, the first cycle interval terminating and the second cycle interval commencing upon activation of the latch means;
  (g) means for gating the circuit means, whereby the circuit means is responsive to the receiver coil during a sample interval only for each transmitter coil, a subset of the coil tap nodes being activated by the selector means during the sample interval for enhancing linearity of the position signal between the coil tap nodes; and
  (h) threshold means for detecting a predetermined magnitude of the receiver signal, the threshold means providing a valid signal when the transducer body is aligned within a predetermined distance from the first transmitter coil.

38. A method for measuring a coordinate position, comprising the steps of:
  (a) providing a helical transmitter coil having end extremities and a plurality of coil tap nodes spaced between the end extremities;
  (b) driving the transmitter coil with an AC signal for producing electrical current in the coil simultaneously in opposite directions on both sides of a selected one of the coil tap nodes;

(c) sequentially selecting a plurality of the coil tap nodes for producing a moving fringing field;

(d) locating a receiver coil at the coordinate position for producing a receiver signal responsive to the fringing field; and (e) detecting a centroid position of the receiver signal. the centroid position being representative of the coordinate position.

* * * * *